United States Patent
Rong et al.

(10) Patent No.: US 10,154,324 B2
(45) Date of Patent: Dec. 11, 2018

(54) METHOD AND SYSTEM FOR UPDATING OPTICAL DISTRIBUTION NETWORK (ODN) DEVICE BY USING INTELLIGENT MANAGEMENT TERMINAL

(71) Applicant: FIBERHOME TELECOMMUNICATION TECHNOLOGIES CO., LTD., Wuhan, Hubei (CN)

(72) Inventors: Yun Rong, Hubei (CN); Jie Zhao, Wuhan (CN); Gang Wang, Wuhan (CN); Xin Wang, Hubei (CN)

(73) Assignee: FIBERHOME TELECOMMUNICATION TECHNOLOGIES CO., LTD., Wuhan, Hubei (CN)

( * ) Notice: Subject to any disclaimer, the term of this patent is extended or adjusted under 35 U.S.C. 154(b) by 286 days.

(21) Appl. No.: 15/039,213

(22) PCT Filed: Sep. 18, 2014

(86) PCT No.: PCT/CN2014/086804
§ 371 (c)(1),
(2) Date: May 25, 2016

(87) PCT Pub. No.: WO2015/090091
PCT Pub. Date: Jun. 25, 2015

(65) Prior Publication Data
US 2017/0164075 A1    Jun. 8, 2017

(30) Foreign Application Priority Data
Dec. 18, 2013    (CN) .......................... 2013 1 0698194

(51) Int. Cl.
G06F 15/177        (2006.01)
H04Q 11/00        (2006.01)
(Continued)

(52) U.S. Cl.
CPC ....... H04Q 11/0066 (2013.01); H04B 10/225 (2013.01); H04B 10/2504 (2013.01);
(Continued)

(58) Field of Classification Search
USPC .......................................................... 709/221
See application file for complete search history.

(56) References Cited

U.S. PATENT DOCUMENTS 6,393,116 B1 *   5/2002   Kaiser ............... H04M 3/42153
                                                       379/201.12
7,912,071 B2 *   3/2011   Ikeda .................. H04L 12/2856
                                                       370/254
(Continued)

FOREIGN PATENT DOCUMENTS

| CN | 102307107 A | 1/2012 |
|---|---|---|
| CN | 202798760 U | 3/2013 |
| CN | 103067797 A | 4/2013 |
| CN | 103701640 A | 4/2014 |
| WO | WO 2013/122519 A1 | 8/2013 |

Primary Examiner — Alicia Baturay
(74) Attorney, Agent, or Firm — Muncy, Geissler, Olds & Lowe, P.C.

(57) ABSTRACT

A method and system for updating an Optical Distribution Network (ODN) device by using an intelligent management terminal are disclosed. The method includes the following steps: an ODN management server connects to an intelligent management terminal through 2G/3G/Wifi, the intelligent management terminal is connected to an identifier of fiber's both terminations through USB or Bluetooth; the optical fiber connector is connected to an ODN device through USB, the ODN management server communicates wirelessly with the ODN device through the intelligent management terminal as a transfer station, and the ODN device downloads updating file from the ODN management server through the intelligent management terminal as a transfer station. The method and system can realize the wireless communication between the ODN network management server and the ODN device, thereby accomplishing the
(Continued)

updating of the ODN device by the intelligent management terminal without cable networks wherever 2G/3G/Wifi.

6 Claims, 2 Drawing Sheets

(51) Int. Cl.
*H04L 12/24* (2006.01)
*H04B 10/00* (2013.01)
*H04B 10/25* (2013.01)
*H04L 29/08* (2006.01)

(52) U.S. Cl.
CPC .............. *H04L 12/24* (2013.01); *H04L 29/08* (2013.01); *H04L 41/082* (2013.01); *H04Q 11/0067* (2013.01); *H04Q 2011/0079* (2013.01)

(56) References Cited

U.S. PATENT DOCUMENTS

| | | | | |
|---|---|---|---|---|
| 8,402,120 | B1* | 3/2013 | Perkinson | H04L 67/16 370/254 |
| 8,490,159 | B2* | 7/2013 | Costa | H04Q 11/0067 726/3 |
| 8,660,430 | B2* | 2/2014 | Zheng | H04Q 11/0067 398/115 |
| 9,436,518 | B2* | 9/2016 | Wang | H04Q 11/0067 |
| 9,467,335 | B2* | 10/2016 | Weng | H04L 41/0806 |
| 2013/0315594 | A1* | 11/2013 | Liang | H04B 10/27 398/66 |
| 2017/0195184 | A1* | 7/2017 | Huang | H04L 41/0806 |

* cited by examiner

US 10,154,324 B2

METHOD AND SYSTEM FOR UPDATING OPTICAL DISTRIBUTION NETWORK (ODN) DEVICE BY USING INTELLIGENT MANAGEMENT TERMINAL

BACKGROUND OF THE INVENTION

1. Field of the Invention

The present invention relates to the field of intelligent optical distribution networks, and specifically to a method and system for updating an Optical Distribution Network (ODN) device by using an intelligent management terminal.

2. Description of the Related Art

An ODN in an optical transport network plays a key role in connecting a backbone network. In a PON (Passive Optical Network), an ODN, a network composed of all passive optical fibers and passive devices (optical divers) between an OLT (Optical Line Terminal) and an ONU (Optical Network Unit), provides an optical transmission channel between the OLT and the ONU.

A major function of intelligent management is to provide a graphical management tool for users. The object of management covers all network resources in the ODN, so that users can exactly know all optical network resources. Such a tool can realize real-time management over network resources, port state, circuit jumper connection and fiber routing, and exactly locate a network connection failure point, thereby quickly removing network connection failure, improving network service quality, and realizing visual, manageable and controllable ODN resources. An ODN management server is directly connected to an ODN device through an Ethernet interface. ODN data can be entered into the ODN management server when optical line planning is finished. The ODN management server can directly transmit the data to the directly connected ODN device after processing the data.

The ODN device refers to a device which has a certain function in ODN operation and maintenance via a combination of software and hardware, for example, cross connection cabinet and identifier of fiber's both terminations, etc. Being the foundation of intelligent management for the ODN, ODN devices are closely integrated with a variety of network resources for optical line connection. The ODN can be smoothly updated to have an intelligent management feature.

Box eID (Radio Frequency Identification) information is information stored in a radio frequency identification. A box eID contains the attribute information of an ODN device that needs to be updated, such as position and device type. An intelligent management terminal that does not store user names and passwords corresponding to the box eID information may not search or find correct user names and passwords; consequently, it cannot log in the device updating interface to update the ODN devices, thereby preventing any unauthorized intelligent management terminal from improperly operating the devices.

The identifier of fiber's both terminations has a function of reading device eID. The intelligent management terminal may not directly read the eID information of ODN devices. Only the identifier of fiber's both terminations can read the eID information and transmit it to the intelligent management terminal. The identifier of fiber's both terminations can also manage the ODN devices. It is a module to realize information interaction between the ODN devices and the intelligent management terminal.

The intelligent management terminal is generally a mobile communication terminal, which is small in volume, likely to be carried and usable for a long time. An electronic product, which can load integrated management software needed by a network management system, such as mobile phone and tablet computer, can serve as an intelligent management terminal. Having a same application method as a variety of software of common intelligent management terminals, the management software integrated in the intelligent management terminal is installable, downloadable and upgradable, and is easy to operate and learn through simple training.

By communicating with the ODN devices through a 485 serial bus or USB (Universal Serial BUS) interface, etc., and communicating with the ODN management server through 2G/3G/Wifi, the intelligent management terminal receives data or commands from the ODN management server, transmits data or commands to the ODN devices, and transmits network connection data collected through the ODN devices to the ODN management server.

During the updating of an ODN device, the ODN management server functions as follows:

(1) Storing a software updating files of the ODN device: the ODN network management server stores the software updating files of the device on a local server;

(2) Providing a software updating file list of the ODN device: the ODN management server provides a file list interface for the intelligent management terminal to invoke and obtain the updating file list;

(3) Providing the software updating files of the ODN device for downloading: the ODN management server provides updating files downloading interface for the intelligent management terminal to invoke and download the software updating files of the ODN device; and (4) Receiving a device updating event reported by the intelligent management terminal.

The ODN management server transmits operation and maintenance commands to the ODN device. Its role is to manage software and hardware resources in the ODN device, so that the user can exactly know and utilize various ODN resources. Software and hardware adjustment and function change in these operations for updating the ODN device may not be achieved without proper adjustment and optimization of software codes. ODN device updating is a normal operation for network maintenance and operation. If the software is not updated in a timely manner, the ODN device may not meet the need of business at the present stage due to too low software version.

At present, an ODN management server conventionally updates an ODN device through Ethernet connection. It transmits updating files and an updating command to the ODN device through wire transmission. It is largely limited to carry out device updating through wire transmission. As some ODN devices are disposed in the wild and in sparsely populated places where no wired network is accessed nearby, their updating is rather inconvenient; if the devices cannot be updated in real time, newly added functions cannot be put into use. Even if Ethernet is disposed nearby, connecting the wired network to the ODN devices such as cross connection cabinet and distribution frame will increase cost of ODN construction.

SUMMARY OF THE INVENTION

Aiming to overcome the defects of the above-mentioned background art, the present invention provides a method and system for updating an ODN device using an intelligent management terminal, which can realize the wireless communication between an ODN management server and the ODN device, thereby accomplishing the updating of the ODN device by the intelligent management terminal without cable networks wherever 2G/3G/Wifi.

The present invention provides a system for updating an ODN device using an intelligent management terminal, including an ODN management server, and further including the intelligent management terminal, an identifier of fiber's both terminations, a plurality of ODN devices and a plurality of box eIDs, where the intelligent management terminal is connected to the ODN management server through 2G/3G/Wifi to download updating files of an ODN device to be updated to a memory card of the intelligent management terminal; the intelligent management terminal is further connected to the identifier of fiber's both terminations through USB or Bluetooth; the identifier of fiber's both terminations is connected to the plurality of ODN devices through USB; each ODN device is connected to a box eID; the intelligent management terminal obtains box eID information, which includes ODN device type information, and makes a list of ODN devices to be updated according to device type; and the intelligent management terminal obtains device user name and password information stored in the intelligent management terminal according to the box eID information, and transmits such information to the ODN devices for authentication.

Based on the above-mentioned technical scheme, the authentication of the ODN devices has a following process:

step 101: the intelligent management terminal obtains box eID information; the box eID information in a database of the intelligent management terminal is respectively corresponding to a user name and a password;

step 102: the intelligent management terminal searches user names and passwords corresponding to the obtained box eID information;

step 103: the intelligent management terminal sends the user names and passwords searched to the ODN devices;

step 104: the ODN devices judge whether the user names and passwords received are correct; if the user names and passwords received are correct, the ODN devices go to step 105; and if the user names and passwords received are false, the ODN devices go to step 106;

step 105: if the authentication succeeds, the ODN devices feed back to the intelligent management terminal which device needs to be updated; and the intelligent management terminal logs in an ODN device updating interface; and step 106: if the authentication fails, the ODN devices feed no operation right to update back to the intelligent management terminal; and the intelligent management terminal displays no ODN device updating right.

Based on the above-mentioned technical scheme, each time after transmitting an updating package data command before updating an ODN device, the intelligent management terminal transmits a subsequent updating package data command only when receiving a return package of a present command.

Based on the above-mentioned technical scheme, the intelligent management terminal continues to send a present command frame after receiving a false command return package.

Based on the above-mentioned technical scheme, the intelligent management terminal further reports failed ODN device updating information to the ODN management server.

The present invention further provides a method for updating an ODN device using an intelligent management terminal, based on the above-mentioned system, which includes the following steps:

S1: an ODN management server stores ODN device software updating files on a local server;

S2: the intelligent management terminal is connected to the ODN management server through 2G/3G/Wifi to obtain an updating file list, download the updating files, and judge whether the downloading succeeds; if the downloading succeeds, the intelligent management terminal goes to step S3; if the downloading fails, the intelligent management terminal goes to step S20;

S3: the intelligent management terminal stores the downloaded updating files on a memory card of the intelligent management terminal, and goes to step S4;

S4: the intelligent management terminal is connected to an identifier of fiber's both terminations through USB or Bluetooth; the identifier of fiber's both terminations is connected to ODN devices through USB; the intelligent management terminal obtains box eID information of the ODN devices through the identifier of fiber's both terminations, and judges whether the obtaining of the box eID information of the ODN devices succeeds; if the obtaining of the box eID information of the ODN devices succeeds, the intelligent management terminal goes to step S6; if the obtaining of the box eID information of the ODN devices fails, the intelligent management terminal goes to step S5;

S5: the intelligent management terminal displays failed of obtaining box eID information, and goes to step S20;

S6: the intelligent management terminal searches ODN device user names and passwords corresponding to the eID information stored in a database of the intelligent management terminal, and sends the user names and passwords searched to the ODN devices for authentication: the ODN devices judge whether the user names and passwords received are correct; if the user names and passwords received are correct, the ODN devices go to step S8; if the user names and passwords received are false, the ODN devices go to step S7;

S7: if the authentication fails, the ODN devices feed no operation right to update back to the intelligent management terminal, the intelligent management terminal displays no ODN device updating right, and goes to step S20;

S8: if the authentication succeeds, the ODN devices feed back to the intelligent management terminal which devices need to be updated; the intelligent management terminal logs in an ODN device updating interface to display the ODN device that needs to be updated presently, and choose the ODN device to be updated; the intelligent management terminal transmits an updating command to the ODN device, and goes to step S9;

S9: the intelligent management terminal judges whether the reception of the updating command by the ODN device succeeds; if the reception of the updating command by the ODN device succeeds, the intelligent management terminal goes to step S11; if the reception of the updating command by the ODN device fails, the intelligent management terminal goes to step S10;

S10: if the intelligent management terminal receives no return package sent by the ODN device within a specified time, the reception of the updating command by the ODN device fails; the intelligent management terminal displays failed of updating command reception by the ODN device, and goes to step S20;

S11: after receiving the updating command successfully, the ODN device sends a return package regarding reception of the updating command to the intelligent management terminal, so as to feed back information of succeeded updating command reception; after receiving the information of succeeded updating command reception fed back by the ODN device, the intelligent management terminal sends an updating package data command to the ODN device, and judges whether the reception of the data by the ODN device succeeds; if the reception of the data by the ODN device succeeds, the intelligent management terminal goes to step S14; if the reception of the data by the ODN device fails, the intelligent management terminal goes to step S12;

S12: the intelligent management terminal continues to send data to the ODN device, and judges whether the times of sending the data are less than a value preset by a counter; if the times of sending the data are less than the value preset by the counter, the intelligent management terminal returns to step S11 and continues to send data till the ODN device successfully receives the data and the intelligent management terminal goes to step S14; otherwise, the intelligent management terminal goes to step S13;

S13: the intelligent management terminal displays failed data reception by the ODN device, and goes to step S20;

S14: if the reception of the data by the ODN device succeeds, the intelligent management terminal judges whether the reception of the updating package data by the ODN device is completed; if the reception of the updating package data by the ODN device is completed, the intelligent management terminal goes to step S15; if the reception of the updating package data by the ODN device is not completed, the intelligent management terminal returns to step S12;

S15: the ODN device automatically runs the updating package data; the intelligent management terminal goes to step S16;

S16: the intelligent management terminal judges whether the updating succeeds; if the updating of the ODN device succeeds, the intelligent management terminal goes to step S17; otherwise, the intelligent management terminal goes to step S18;

S17: the ODN device reports succeeded updating to the intelligent management terminal; the intelligent management terminal goes to step S19;

S18: the ODN device reports failed updating to the intelligent management terminal; the intelligent management terminal goes to step S20;

S19: the intelligent management terminal displays succeeded in updating of the ODN device, and reports the updating result to the ODN management server; and S20: the intelligent management terminal displays failed of updating of the ODN device, and reports the updating result to the ODN management server.

Compared with the prior art, the present invention has the following advantages:

(1) Through 2G/3G/Wifi, the present invention enables an intelligent management terminal and an ODN management server to wirelessly communicate under a relevant network protocol; an ODN device is connected to the intelligent management terminal through USB or Bluetooth, so that a wireless communication can be realized between the ODN management sever and the ODN device; therefore, wherever 2G/3G/Wifi is available, the ODN device can download updating files from the ODN management server through the intelligent management terminal as a transfer station to complete updating of the ODN device, not needing any wired network, thereby completing updating of devices disposed in the wild and in sparsely populated places, etc., where no wired network is accessed; and (2) As the present invention introduces an authentication process into the updating process of the ODN device, only a constructor can update the ODN device using the intelligent management terminal, which holds corresponding user name and password for updating the ODN device, thereby preventing false operation by irrelevant personnel.

DESCRIPTION OF THE PREFERRED EMBODIMENTS

The present invention is further elaborated below according to drawings and embodiments.

Figure 1:
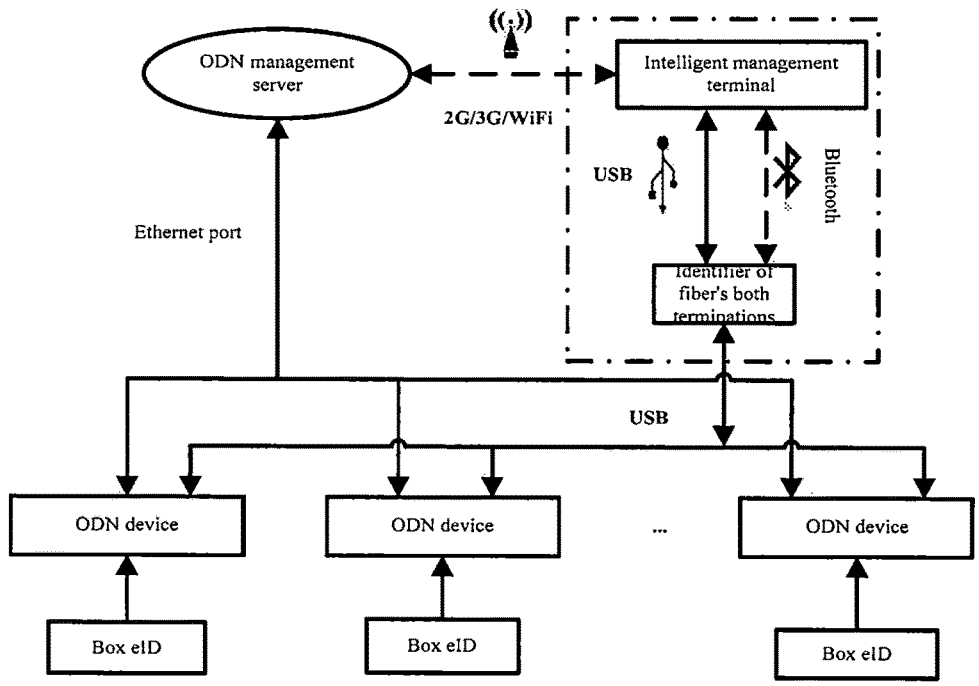
FIG. 1 is a structure diagram of a system for updating an ODN device using an intelligent management terminal according to an embodiment of the present invention.

As shown in FIG. 1, an embodiment of the present invention provides a system for updating an ODN device using an intelligent management terminal, including an ODN management server, the intelligent management terminal, an identifier of fiber's both terminations, a plurality of ODN devices and a plurality of box eIDs, where the intelligent management terminal is connected to the ODN management server through 2G/3G/Wifi to download updating files of an ODN device to be updated to a memory card of the intelligent management terminal; the intelligent management terminal is further connected to the identifier of fiber's both terminations through USB or Bluetooth; the identifier of fiber's both terminations is connected to the plurality of ODN devices through USB; each ODN device is connected to a box eID; the intelligent management terminal obtains box eID information, which includes ODN device type information, etc., and makes a list of ODN devices to be updated according to device type, thereby preventing unnecessary false operation; and the intelligent management terminal obtains device user name and password information stored in the intelligent management terminal according to the box eID information, and transmits such information to the ODN devices for authentication, thereby preventing false operation on the ODN devices, such as updating an ODN device that does not need to be updated, and updating an ODN device by a person not qualified for updating.

Figure 2:
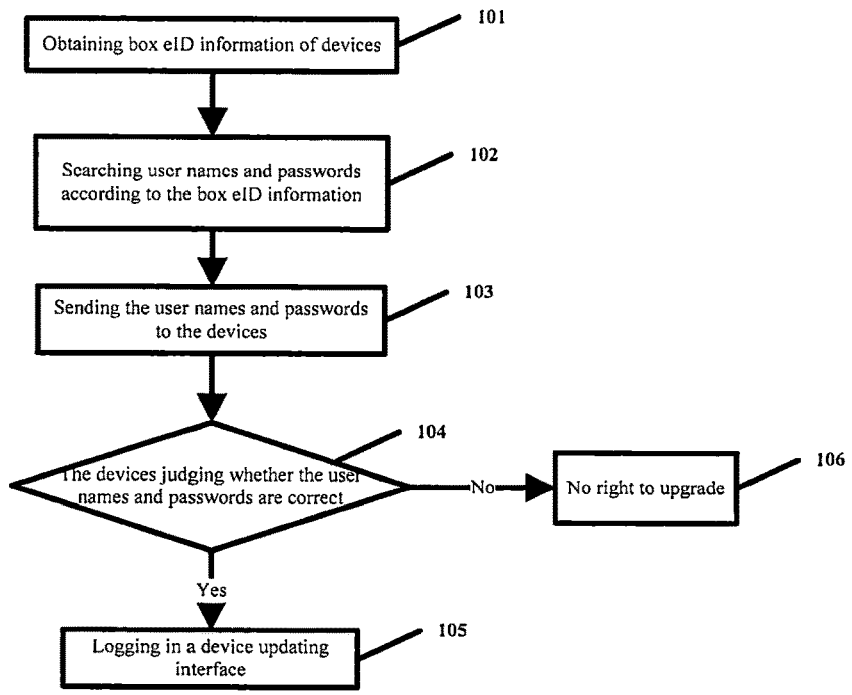
FIG. 2 is a flow diagram of authentication according to an embodiment of the present invention.

As shown in FIG. 2, authentication of ODN devices has a following process:

step 101: an intelligent management terminal obtains box eID information; the box eID information in a database of the intelligent management terminal is respectively corresponding to a user name and a password;

step 102: the intelligent management terminal searches user names and passwords corresponding to the obtained box eID information;

step 103: the intelligent management terminal sends the user names and passwords searched to the ODN devices;

step 104: the ODN devices judge whether the user names and passwords received are correct; if the user names and passwords received are correct, the ODN devices go to step 105; and if the user names and passwords received are false, the ODN devices go to step 106;

step 105: if the authentication succeeds, the ODN devices feed back to the intelligent management terminal which devices need to be updated; and the intelligent management terminal logs in an ODN device updating interface; and step 106: if the authentication fails, the ODN devices feed no operation right to update back to the intelligent management terminal; and the intelligent management terminal displays no ODN device updating right.

Each time after transmitting an updating package data command before updating an ODN device, the intelligent management terminal transmits a subsequent updating package data command only when receiving a return package of a present command. A failure retransmission mechanism is introduced into the updating process. If receiving a false command return package, the intelligent management terminal continues to send a present command frame, so as to guarantee an integrated data transmission. Besides, the intelligent management terminal further reports information of failed ODN device updating to an ODN management server, so as to guarantee real-time data of the ODN management server.

Figure 3:
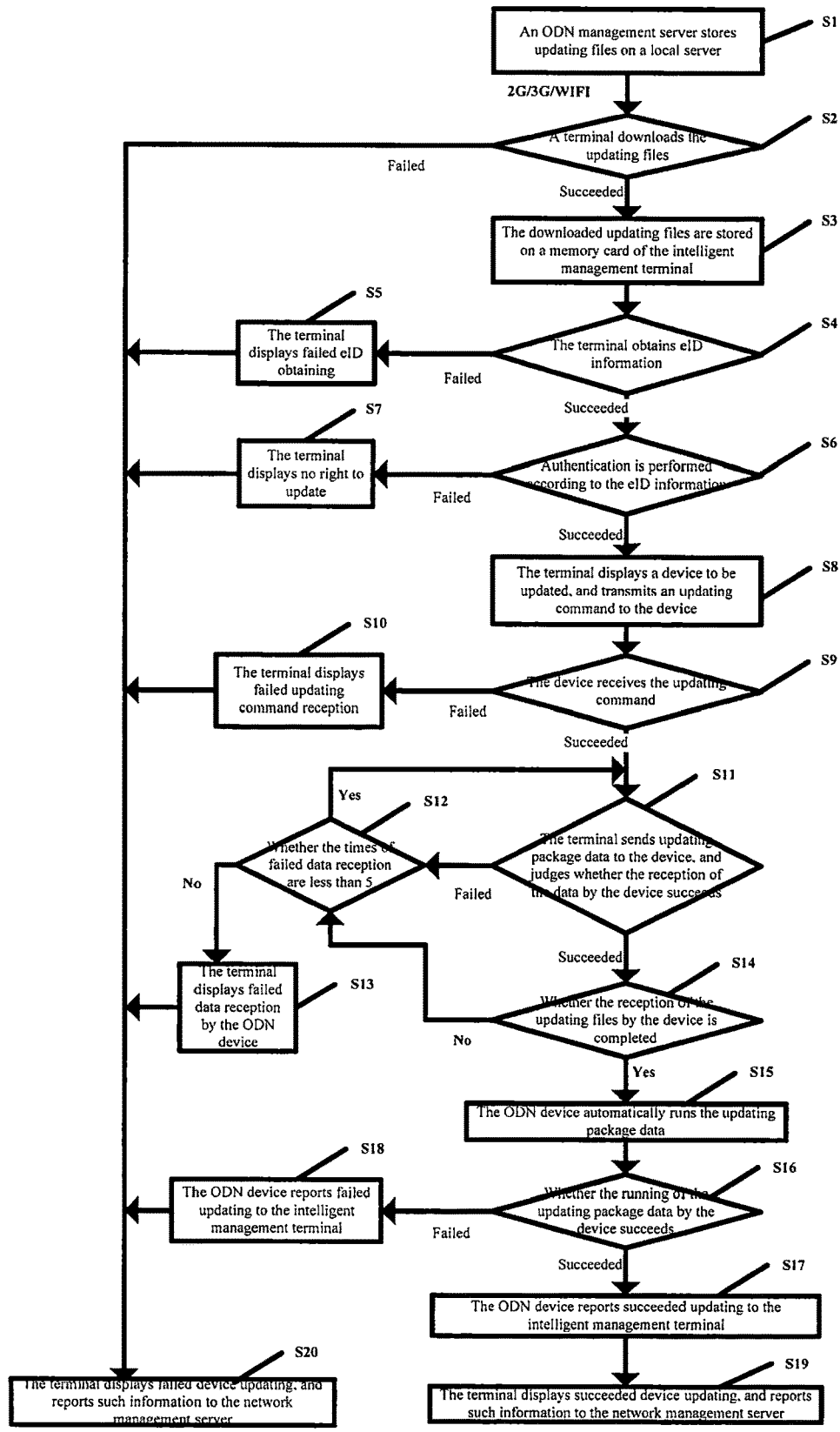
FIG. 3 is a flow diagram of a method for updating an ODN device using an intelligent management terminal according to an embodiment of the present invention.

As shown in FIG. 3, an embodiment of the present invention provides a method for updating an ODN device using an intelligent management terminal, based on the above-mentioned system, which includes the following steps:

S1: an ODN management server stores ODN device software updating files on a local server;

S2: the intelligent management terminal is connected to the ODN management server through 2G/3G/Wifi to obtain an updating file list, download the updating files, and judge whether the downloading succeeds; if the downloading succeeds, the intelligent management terminal goes to step S3; if the downloading fails, the intelligent management terminal goes to step S20;

S3: the intelligent management terminal stores the downloaded updating files on a memory card of the intelligent management terminal, and goes to step S4;

S4: the intelligent management terminal is connected to an identifier of fiber's both terminations through USB or Bluetooth; the identifier of fiber's both terminations is connected to ODN devices through USB; the intelligent management terminal obtains box eID information of the ODN devices through the identifier of fiber's both terminations, and judges whether the obtaining of the box eID information of the ODN devices succeeds; if the obtaining of the box eID information of the ODN devices succeeds, the intelligent management terminal goes to step S6; if the obtaining of the box eID information of the ODN devices fails, the intelligent management terminal goes to step S5;

S5: the intelligent management terminal displays failed of obtaining box eID information, and goes to step S20;

S6: the intelligent management terminal searches ODN device user names and passwords corresponding to the eID information stored in a database of the intelligent management terminal, and sends the user names and passwords searched to the ODN devices for authentication: the ODN devices judge whether the user names and passwords received are correct; if the user names and passwords received are correct, the ODN devices go to step S8; if the user names and passwords received are false, the ODN devices go to step S7;

S7: if the authentication fails, the ODN devices feed no operation right to update back to the intelligent management terminal, the intelligent management terminal displays no ODN device updating right, and goes to step S20;

S8: if the authentication succeeds, the ODN devices feed back to the intelligent management terminal which devices need to be updated; the intelligent management terminal logs in an ODN device updating interface to display the ODN device that needs to be updated presently, and choose the ODN device to be updated; the intelligent management terminal transmits an updating command to the ODN device, and goes to step S9;

S9: the intelligent management terminal judges whether the reception of the updating command by the ODN device succeeds; if the reception of the updating command by the ODN device succeeds, the intelligent management terminal goes to step S11; if the reception of the updating command by the ODN device fails, the intelligent management terminal goes to step S10;

S10: if the intelligent management terminal receives no return package sent by the ODN device within a specified time, the reception of the updating command by the ODN device fails; the intelligent management terminal displays failed of updating command reception by the ODN device, and goes to step S20;

S11: after receiving the updating command successfully, the ODN device sends a return package regarding reception of the updating command to the intelligent management terminal so as to feed back information of succeeded updating command reception; after receiving the information of succeeded updating command reception fed back by the ODN device, the intelligent management terminal sends an updating package data command to the ODN device, and judges whether the reception of the data by the ODN device succeeds; if the reception of the data by the ODN device succeeds, the intelligent management terminal goes to step S14; if the reception of the data by the ODN device fails, the intelligent management terminal goes to step S12;

S12: the intelligent management terminal continues to send data to the ODN device, and judges whether the times of sending the data are less than a value, for example, 5, preset by a counter; if the times of sending the data are less than 5, the intelligent management terminal returns to step S11 and continues to send data until the ODN device successfully receives the data and the intelligent management terminal goes to step S14; otherwise, the intelligent management terminal goes to step S13;

S13: if the ODN device does not successfully receive the data within 5 times, the intelligent management terminal displays failed data reception by the ODN device, and goes to step S20;

S14: if the reception of the data by the ODN device succeeds, the intelligent management terminal judges whether the reception of the updating package data by the ODN device is completed; if the reception of the updating package data by the ODN device is completed, the intelligent management terminal goes to step S15; if the reception of the updating package data by the ODN device is not completed, the intelligent management terminal returns to step S12;

S15: the ODN device automatically runs the updating package data; the intelligent management terminal goes to step S16;

S16: the intelligent management terminal judges whether the updating succeeds; if the updating of the ODN device succeeds, the intelligent management terminal goes to step S17; otherwise, the intelligent management terminal goes to step S18;

S17: the ODN device reports succeeded updating to the intelligent management terminal; the intelligent management terminal goes to step S19;

S18: the ODN device reports failed updating to the intelligent management terminal; the intelligent management terminal goes to step S20;

S19: the intelligent management terminal displays succeeded in updating of the ODN device, and reports the updating result to the ODN management server; and S20: the intelligent management terminal displays failed of updating of the ODN device, and reports the updating result to the ODN management server.

A person skilled in the field may make various amendments and modifications of an embodiment of the present invention. Such amendments and modifications, if falling within the scope of the claims and equal technology of the present invention, shall also fall within the protection scope of the present invention.

Those not described in the specification in detail shall be prior art known to persons skilled in the field.

What is claimed is:

1. A system for updating an ODN device using an intelligent management terminal, comprising an ODN management server, characterized by further comprising the intelligent management terminal, an identifier of fiber's both terminations, a plurality of ODN devices and a plurality of box eIDs, where the intelligent management terminal is connected to the ODN management server through 2G/3G/Wifi to download updating files of an ODN device to be updated to a memory card of the intelligent management terminal; the intelligent management terminal being further connected to the identifier of fiber's both terminations through USB or Bluetooth; the identifier of fiber's both terminations being connected to the plurality of ODN devices through USB; each ODN device being connected to a box eID; the intelligent management terminal obtaining box eID information, which includes ODN device type information, and makes a list of ODN devices to be updated according to device type; and the intelligent management terminal obtaining device user name and password information stored in the intelligent management terminal according to the box eID information, and transmitting such information to the ODN devices for authentication.

2. The system for updating the ODN device using the intelligent management terminal according to claim 1, wherein the authentication of the ODN devices has a following process:
   a first step: the intelligent management terminal obtaining box eID information; the box eID information in a database of the intelligent management terminal being respectively corresponding to a user name and a password;
   a second step: the intelligent management terminal searching user names and passwords corresponding to the obtained box eID information;
   a third step: the intelligent management terminal sending the user names and passwords searched to the ODN devices;
   a fourth step: the ODN devices judging whether the user names and passwords received are correct; if the user names and passwords received are correct, the ODN devices perform a fifth step; and if the user names and passwords received are false, the ODN devices perform a sixth step;
   the fifth step: if the authentication succeeds, the ODN devices feeding back to the intelligent management terminal which devices need to be updated; and the intelligent management terminal logging in an ODN device updating interface; and
   the sixth step: if the authentication fails, the ODN devices feeding no operation right to update back to the intelligent management terminal; and the intelligent management terminal displaying no ODN device updating right.

3. The system for updating the ODN device using the intelligent management terminal according to claim 1, wherein each time after transmitting an updating package data command before updating an ODN device, the intelligent management terminal transmitting a subsequent updating package data command only when receiving a return package of a present command.

4. The system for updating the ODN device using the intelligent management terminal according to claim 1, wherein the intelligent management terminal continues to send a present command frame after receiving a false command return package.

5. The system for updating the ODN device using the intelligent management terminal according to claim 1, wherein the intelligent management terminal further reporting failed ODN device updating information to the ODN management server.

6. A method for updating an ODN device using an intelligent management terminal, characterized by comprising the following steps:
   a first step: an ODN management server storing ODN device software updating files on a local server;
   a second step: the intelligent management terminal being connected to the ODN management server through 2G/3G/Wifi to obtain an updating file list, downloading the updating files, and judging whether the downloading succeeds; if the downloading succeeds, the intelligent management terminal performs a third step; if the downloading fails, the intelligent management terminal performs a twentieth step;
   the third step: the intelligent management terminal storing the downloaded updating files on a memory card of the intelligent management terminal, and performing a fourth step;
   the fourth step: the intelligent management terminal being connected to an identifier of fiber's both terminations through USB or Bluetooth; the identifier of fiber's both terminations being connected to ODN devices through USB; the intelligent management terminal obtaining box eID information of the ODN devices through the identifier of fiber's both terminations, and judging whether the obtaining of the box eID information of the ODN devices succeeds; if the obtaining of the box eID information of the ODN devices succeeds, the intelligent management terminal performs a sixth step; if the obtaining of the box eID information of the ODN devices fails, the intelligent management terminal performs a fifth step;
   the fifth step: the intelligent management terminal displaying failed of obtaining box eID information, and performing the twentieth step;
   the sixth step: the intelligent management terminal searching ODN device user names and passwords corresponding to the eID information stored in a database of the intelligent management terminal, and sending the user names and passwords searched to the ODN devices for authentication: the ODN devices judging whether the user names and passwords received are correct; if the user names and passwords received are correct, the ODN devices perform a eighth step; if the user names and passwords received are false, the ODN devices perform a seventh step;
   the seventh step: if the authentication fails, the ODN devices feed no operation right to update back to the intelligent management terminal, the intelligent management terminal displays no ODN device updating right, and performs the twentieth step;

the eighth step: if the authentication succeeds, the ODN devices feed back to the intelligent management terminal which devices need to be updated; the intelligent management terminal logging in an ODN device updating interface to display the ODN device that needs to be updated presently, and choosing the ODN device to be updated; the intelligent management terminal transmitting an updating command to the ODN device, and performing a ninth step;

the ninth step: the intelligent management terminal judging whether the reception of the updating command by the ODN device succeeds; if the reception of the updating command by the ODN device succeeds, the intelligent management terminal performs an eleventh step; if the reception of the updating command by the ODN device fails, the intelligent management terminal performs a tenth step;

the tenth step: if the intelligent management terminal receives no return package sent by the ODN device within a specified time, the reception of the updating command by the ODN device fails; the intelligent management terminal displaying failed of updating command reception by the ODN device, and performing the twentieth step;

the eleventh step: after receiving the updating command successfully, the ODN device sending a return package regarding reception of the updating command to the intelligent management terminal, so as to feed back information of succeeded updating command reception; after receiving the information of succeeded updating command reception fed back by the ODN device, the intelligent management terminal sending an updating package data command to the ODN device, and judging whether the reception of the data by the ODN device succeeds; if the reception of the data by the ODN device succeeds, the intelligent management terminal performs a fourteenth step; if the reception of the data by the ODN device fails, the intelligent management terminal performs a twelfth step;

the twelfth step: the intelligent management terminal continuing to send data to the ODN device, and judging whether the times of sending the data are less than a value preset by a counter; if the times of sending the data are less than the value preset by the counter, the intelligent management terminal performs the eleventh step and continues to send data till the ODN device successfully receives the data and the intelligent management terminal performs the fourteenth step; otherwise, the intelligent management terminal performs a thirteenth step;

the thirteenth step: the intelligent management terminal displaying failed data reception by the ODN device, and performing the twentieth step;

the fourteenth step: if the reception of the data by the ODN device succeeds, the intelligent management terminal judges whether the reception of the updating package data by the ODN device is completed; if the reception of the updating package data by the ODN device is completed, the intelligent management terminal performs a fifteenth step; if the reception of the updating package data by the ODN device is not completed, the intelligent management terminal performs the twelfth step;

the fifteenth step: the ODN device automatically running the updating package data; the intelligent management terminal performing a sixteenth step;

the sixteenth step: the intelligent management terminal judging whether the updating succeeds; if the updating of the ODN device succeeds, the intelligent management terminal performs a seventeenth step; otherwise, the intelligent management terminal performs an eighteenth step;

the seventeenth step: the ODN device reporting succeeded updating to the intelligent management terminal; the intelligent management terminal performing a nineteenth step;

the eighteenth step: the ODN device reporting failed updating to the intelligent management terminal; the intelligent management terminal performing the twentieth step;

the nineteenth step: the intelligent management terminal displaying succeeded in updating of the ODN device, and reporting the updating result to the ODN management server; and the twentieth step: the intelligent management terminal displaying failed of updating of the ODN device, and reporting the updating result to the ODN management server.

* * * * *